United States Patent
Grosof et al.

(10) Patent No.: US 9,367,807 B2
(45) Date of Patent: Jun. 14, 2016

(54) METHOD AND SYSTEM THAT PROVIDES EFFICIENT INDEX-BASED RETRIEVAL OF RULES

(71) Applicants: Vulcan, Inc., Seattle, WA (US); The Research Foundation for the State University of New York, Albany, NY (US)

(72) Inventors: Benjamin Nathan Grosof, Mercer Island, WA (US); Michael Kifer, Setauklet, NY (US)

(73) Assignee: Vulcan, Inc., Seattle, WA (US)

( * ) Notice: Subject to any disclaimer, the term of this patent is extended or adjusted under 35 U.S.C. 154(b) by 171 days.

(21) Appl. No.: 13/872,757

(22) Filed: Apr. 29, 2013

(65) Prior Publication Data

US 2014/0324753 A1    Oct. 30, 2014

(51) Int. Cl.
*G06N 5/02*     (2006.01)
*G06F 17/00*    (2006.01)

(52) U.S. Cl.
CPC ..................................... *G06N 5/025* (2013.01)

(58) Field of Classification Search
None
See application file for complete search history.

(56) References Cited

U.S. PATENT DOCUMENTS 5,537,590 A * 7/1996 Amado
6,681,380 B1 * 1/2004 Britton et al. ................. 717/115
2005/0108001 A1 * 5/2005 Aarskog .......................... 704/10
2010/0278420 A1 * 11/2010 Shet et al. ..................... 382/156
2012/0330875 A1 * 12/2012 Angele ............................ 706/47

OTHER PUBLICATIONS

Tim Smith, Prolog fundamentals—Dec. 14, 2004, https://web.archive.org/web/20041214084247/http://www.inf.ed.ac.uk/teaching/courses/aipp/.*
Tim Smith, Combining Lists and Built-in Predicates—Dec. 14, 2004, https://web.archive.org/web/20041214084247/http://www.inf.ed.ac.uk/teaching/courses/aipp/.*
Bijan Arbab, Operational and denotational semantics of prolog, vol. 4, Issue 4, Dec. 1987, pp. 309-329 http://www.sciencedirect.com/science/article/pii/0743106687900082.*

* cited by examiner

*Primary Examiner* — Kakali Chaki
*Assistant Examiner* — Viker Lamardo
(74) *Attorney, Agent, or Firm* — Olympic Patent Works PLLC

(57) ABSTRACT

The current application is directed to methods, and to systems employing the methods, that allow built-in indexing methods for facts, to additionally be applied to rules within a logic-programming system. The methods and systems to which the current application is directed convert an original set of rules into an equivalent set of fact/rule pairs. In addition, a new set of rules may be directly encoded as a new set of fact/rule pairs by these methods and systems. The equivalent set of fact/rule pairs implement the original set of rules, preserving the meaning of the original rules, but the equivalent set of fact/rule pairs are indexed by built-in indexing methods for facts. The new fact/rule pairs are also indexed by built-in indexing methods for facts.

20 Claims, 9 Drawing Sheets

| # | rule |
|---|---|
| 1 | $a1(X,Y) :- body_1$ |
| 2 | $a1(X,Y,Z) :- body_2$ |
| 3 | $r32(a,b,x) :- body_3$ |
| 4 | $r1(X,Y) :- body_4$ |
| 5 | $a1(a,b,x) :- body_5$ |
| 6 | $x(X,a,b) :- body_6$ |
| 7 | $a1(X,Y,a) :- body_7$ |
| 8 | $r32(X,Y) :- body_8$ |
| 9 | $r32(X,Y,c) :- body_9$ |
| 10 | $a1(X,Y,d) :- body_{10}$ |
| 11 | $a1(X,Y,Z,b) :- body_{11}$ |
| 12 | $r32(a,c,x) :- body_{12}$ |
| 13 | $r1(X,Y,Z) :- body_{13}$ |
| 14 | $x(a) :- body_{14}$ |
| 15 | $a1(X) :- body_{15}$ |
| 16 | $x(X,Y,a,b) :- body_{16}$ |
| 17 | $r1(a,b) :- body_{17}$ |
| 18 | $r1(a,c) :- body_{18}$ |
| 19 | $a1(a,e) :- body_{19}$ |
| 20 | $a1(b) :- body_{20}$ |
| 21 | $x(f,X) : body_{21}$ |
| 22 | $x(e,g,X) :- body_{22}$ |
| 23 | $x(e,g,X,Y) :- body_{23}$ |

FIG. 5

METHOD AND SYSTEM THAT PROVIDES EFFICIENT INDEX-BASED RETRIEVAL OF RULES

TECHNICAL FIELD

The current application is directed to logic-programming systems and, in particular, to methods that enable application of built-in indexing methods and subsystems for indexing and retrieving facts to be applied to rules in logic-programming systems and to systems and subsystems that incorporate the method.

BACKGROUND

Logic programming represents one of the main branches of computer-programming. Unlike familiar procedural programming languages, including C, C++, Java, Fortran, Ruby, and many other procedural languages, logic programming focuses on declarative specification of logic, encoding logic in predicates and rules. Theoretical groundwork for logic programming was developed in the 1930s and logic-programming systems began to be practically implemented in the late 1960s. In 1972, the logic-programming language Prolog was developed. Prolog programs include predicates, rules, and many built-in predicates and operators. Prolog programs are processed at runtime by a proof rule called resolution. There are many different Prolog implementations and dialects, and many additional Prolog-like logic-programming languages, including HiLog, F-logic, and λ-Prolog.

Logic programming is widely used for implementing knowledge-based expert systems. These systems may be used for complex scheduling and operations management, management and control of automated order-processing, verification of integrated-circuit design, analysis of data obtained from a variety of different types of instrumentation, diagnosis of operational behaviors and failures of complex systems, and for many other purposes.

As with any type of computational method, there are different advantages and disadvantages associated with logic programming. The declarative focus of logic programming often facilitates concise implementations of complex computational, freeing developers from the need to encode procedural routines specifically tailored to particular problem domains. Logic programming is frequently employed for prototyping, for this reason. Evaluation of predicates and rules encoded within programs written using logic programming may involve complex, recursive searching operations over large numbers of facts and rules stored in memory and mass-storage subsystems within computer systems, using various types of search strategies or combinations of search strategies. The computational efficiency of logic-programming systems may often depend on the underlying efficiencies of storage and retrieval methods for facts and rules, of which users of logic-programming languages may be unaware. As logic-programming languages and logic-programming computational systems continue to evolve, designers, developers, and users of logic programming continue to seek ever more computationally efficient methods for representing information and for processing queries related to that information.

SUMMARY

The current application is directed to methods, and to systems employing the methods, that allow built-in indexing methods for facts, to additionally be applied to rules within a logic-programming system. The methods and systems to which the current application is directed convert an original set of rules into an equivalent set of fact/rule pairs. In addition, a new set of rules may be directly encoded as a new set of fact/rule pairs by these methods and systems. The equivalent set of fact/rule pairs implement the original set of rules, preserving the meaning of the original rules, but the equivalent set of fact/rule pairs are indexed by built-in indexing methods for facts. The new fact/rule pairs are also indexed by built-in indexing methods for facts.

BRIEF DESCRIPTION OF THE DRAWINGS

FIG. 5 provides an example set of stored rules.

DETAILED DESCRIPTION

Figure 1:
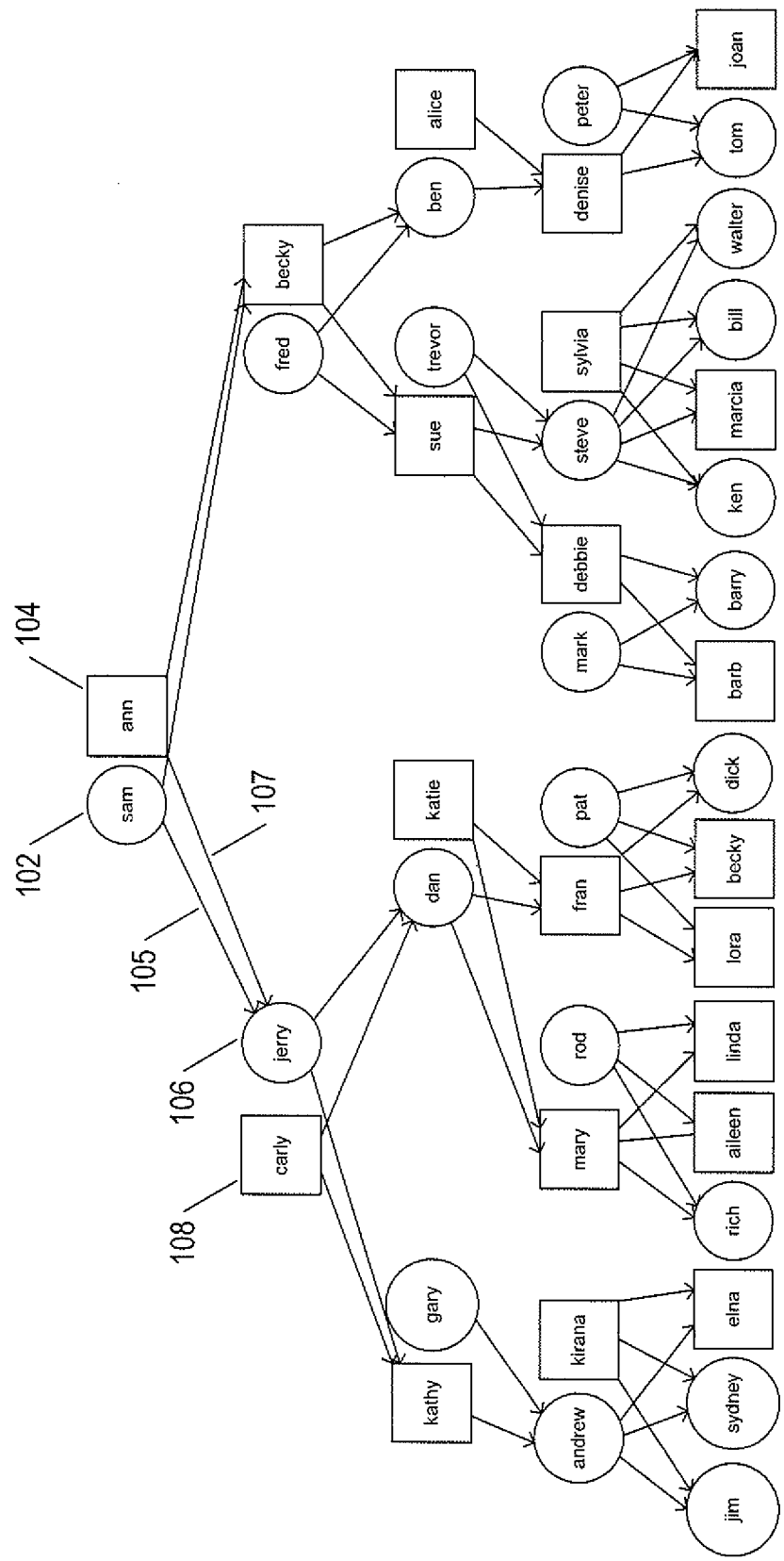
FIG. 1 illustrates an example family tree that is encoded using Prolog predicates.

The current application is directed to methods, and subsystems that employ the methods, involved with storage and retrieval of facts and rules within a logic-programming computer system. In the current application, the methods and systems to which the current application is directed are described using logic programming examples. However, as those familiar with modern science and technology well appreciate, storage of facts and rules in electronic memories and mass-storage subsystems within a computer system and retrieval of stored facts and rules from electronic memories, mass-storage subsystems, and other data-storage component involve physical changes within the physical data-storage components. These physical changes, like all physical changes, can be described in terms of thermodynamic state variables, including enthalpy and entropy, and occur over time intervals. Computationally efficient storage and retrieval operations are generally associated with either or both of lower energy consumption and smaller operational latencies. Thus, storage and retrieval of facts and rules within a logic-programming system are tangible, physical processes involving physical transformations that can be characterized by power consumption, changes in thermodynamic state variables, and durations. It is common to describe the control of physical processes, including the operation of computer systems, using mathematical expressions and/or actual computer code or pseudocode. However, these representations are employed to describe physical processes associated with physical changes within a computer system controlled by computer instructions as well as within other objects and systems that electronically communicate with the computer system.

The current application includes three subsections: (1) An Example Logic-Programming System; (2) Replacement of Rules in the Example Logic-Programming System According to an Implementation of the Methods to Which the Current Application is Directed; and (3) A Formal Description of the Methods to Which the Current Application is Directed. The current application is directed to methods that include various implementations and variations of a currently disclosed rule-replacement method, as well as to systems and subsystems that incorporate the methods to replace original rules with equivalent fact/rule-pair replacements and that provide for direct encodings of new rules as new sets of fact/rule pairs.

An Example Logic-Programming Implemented System

In order to provide a context for the description of the methods and systems to which the current application is directed, a simple, concrete example of a logic-programming system is next provided using a Prolog program, example Prolog queries and responses as well as explanatory figures. The Prolog program encodes logic for a specialized computational system used for tracking the distributions of genetic abnormalities within individuals of an extended family. The system is referred to as the "genetic system" in the following discussion. The example system is intentionally simplified in order to provide an easily understood context for describing the methods and systems to which the current application is directed.

FIG. 1 illustrates an example family tree that is encoded using Prolog predicates. The family tree represents the individuals of an extended family for which the genetic system provides gene-abnormality-distribution information. Each name-labeled disk, such as disk 102 labeled with the name "sane," represents a male individual and name-labeled rectangles, such as rectangle 104 labeled with the name "ann," represent female individuals. In Prolog, names of objects, including individuals in the current example, begin with lower-case letters to distinguish the names of objects from variables, which have names that begin with an upper-case letter. Arrows, such as arrow 105, represent parent-child relationships. Arrow 105, for example, represents the fact that Sam is a parent of Jerry, who is represented by name-labeled disk 106. In the family tree shown in FIG. 1, Sam and Ann, represented by disk 102 and rectangle 104, are the progenitors for the entire family tree. Jerry, the son of Sam and Ann, as indicated by arrows 105 and 107, is or was married to Carly, represented by name-labeled rectangle 108, and are thus progenitors for a second-generation branch of the family tree, or subtree. There are no parent-child arrows leading to Carly because Carly is not a child of either Sam or Ann. The example family tree shown in FIG. 1 includes individuals of five generations.

In Prolog, the family tree shown in FIG. 1 can be represented using a series of facts. All of the females in the family tree can be represented, in Prolog, by the following set of facts:
  female(ann).
  female(carly).
  female(betsy).
  female(kathy).
  female(katie).
  female(sue).
  female(alice).
  female(kirana).
  female(mary).
  female(fran).
  female(debbie).
  female(sylvia).
  female(denise).
  female(elna).
  female(aileen).
  female(linda).
  female(lora).
  female(becky).
  female(barb).
  female(marcia).
  female(joan).

Each line in the above program extract includes a single fact. Each fact states that a particular object, which represents an individual of the extended family, is a female. The name of the predicate of each fact is female and the object name within parentheses is a single argument of the predicate female. In Prolog, each program, fact, or rule ends with a period.

Similarly, all of the male individuals in the family tree can be represented by an additional set of facts, or predicates:
  male(sam).
  male(jerry).
  male(fred).
  male(gary).
  male(dan).
  male(trevor).
  male(ben).
  male(andrew).
  male(rod).
  male(pat).
  male(mark).
  male(steve).
  male(peter).
  male(jim).
  male(sydney).
  male(rich).
  male(dick).
  male(barry).
  male(ken).
  male(bill).
  male(walter).
  male(tom).

All of the parent-child relationships in the family tree shown in FIG. 1, represented in FIG. 1 by arrows, can next be represented, in Prolog, by a third set of facts.
  parent(sam, Jerry).
  parent(sam, betsy).
  parent(ann, jerry).
  parent(ann, betsy).
  parent(carly, kathy).
  parent(carly, dan).
  parent(jerry, kathy).
  parent(jerry, dan).
  parent(fred, sue).
  parent(fred, ben).
  parent(betsy, sue).
  parent(betsy, ben).
  parent(kathy, andrew).
  parent(gary, andrew).
  parent(dan, mary).
  parent(dan, fran).
  parent(katie, mary).
  parent(katie, fran),
  parent(sue, debbie).
  parent(sue, steve).
  parent(trevor, debbie).
  parent(trevor, steve).
  parent(ben, denise).
  parent(alice, denise).

parent(andrew, Jim).
parent(andrew, sydney).
parent(andrew, elna).
parent(kirana, Jim).
parent(kirana, sydney).
parent(kirana, elna).
parent(mary, rich).
parent(mary, aileen).
parent(mary, linda).
parent(rod, rich).
parent(rod, aileen).
parent(rod, linda).
parent(fran, lora).
parent(fran, becky).
parent(fran, dick).
parent(pat, lora).
parent(pat, becky).
parent(pat, dick).
parent(mark, barb).
parent(mark, barry).
parent(debbie, barb).
parent(debbie, barry).
parent(steve, ken).
parent(steve, marcia).
parent(steve, bill).
parent(steve, walter).
parent(sylvia, ken).
parent(sylvia, marcia).
parent(sylvia, bill).
parent(sylvia, walter).
parent(denise, tom).
parent(denise, joan).
parent(peter, tom).
parent(peter, joan).

Each of the above facts represents a relationship between two individuals. The fact "parent (sam, jerry)" states, for example, that Sam is a parent of Jerry, and corresponds to arrow 105 in FIG. 1. Thus, the above-provided sets of facts, including the set of female facts, the set of male facts, and the set of parent facts, fully represent the family tree shown in FIG. 1. Of course, as within any computational system, there are many different ways to represent the family tree shown in FIG. 1 in Prolog. For example, the fact that Ann is a female could have alternatively been represented by a two-argument predicate, or instance of a binary relation, "gender(ann, female)."

In Prolog, a predicate includes a predicate name, as mentioned above, and generally includes one or more arguments contained with parentheses. The number of arguments is referred to as the "arity" of the predicate. Arguments that begin with a lower-case letter, such as "ann," are constant arguments or object-names. For example, in Prolog, the constant "arm" means that there is an object named "ann." All of the predicates listed above are fully instantiated. A predicate may also contain variable arguments, which are instantiated when the predicate is evaluated or resolved.

In Prolog, a relationship can be represented by using predicates, by using rules, or by using both predicates and rules. A fact can be considered as a rule with empty body. The following rule defines a mother relationship in the current example:

mother(X,Y):-parent(X,Y),
female(X).

The rule defining the mother relationship is a Prolog clause that includes a head predicate "mother(X,Y)," a two-character symbol ":-" corresponding to logical notion "if" or "entailed by," and a rule body "parent(X,Y), female(X)." A rule body consists of a single term or multiple terms separated by commas. The comma represents a logical AND and, in the above rule, each term is a predicate. The symbols "X" and "Y" are variables. The rule mother states, for all instances of the variables X and Y, that X is a mother of Y if X is a parent of Y and X is female. The variables X and Y are instantiated, during rule evaluation, to possible pairs of objects, with the rule evaluating to "true" when the relationship specified by the rule is true for a pair of instances of the variables X and Y, such as "ann" and "jerry."

Figure 2:
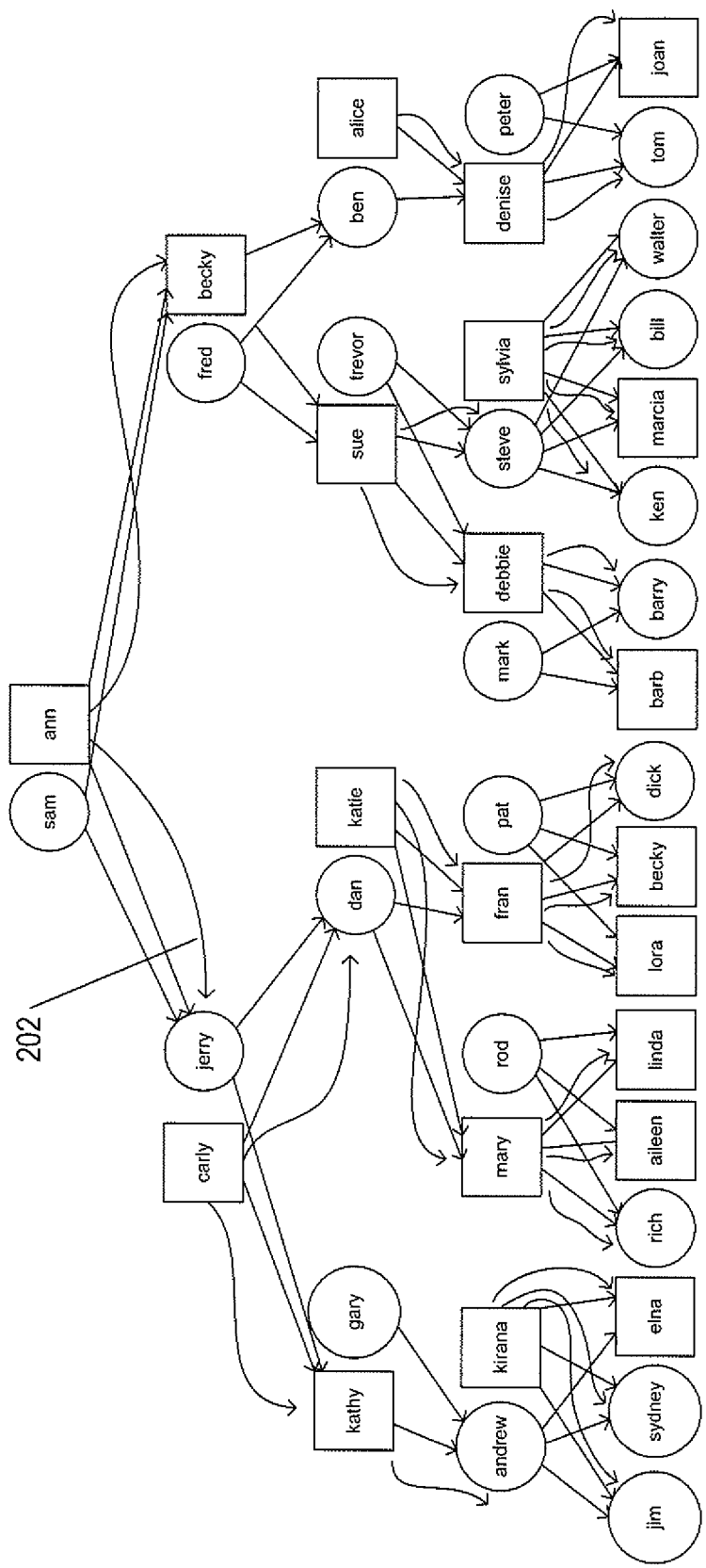
FIG. 2 illustrates the mother relationship within the family tree shown in FIG. 1.

A rule, such as the mother rule, is a concise representation of a relationship between objects. The relationship can be alternatively represented by a set of predicates, such as the predicate "mother(ann, jerry)." FIG. 2 illustrates the mother relationship within the family tree shown in FIG. 1. In FIG. 2, curved arrows, such as the curved arrow 202, represent a mother relationship. Curved arrow 202 represents the fact that Ann is the mother of Jerry. All of the mother relationships within a family tree, shown by curved arrows in FIG. 2, are represented in Prolog by the single mother rule, employing universally quantified variables X and Y.

During a run-time query/response session, a Prolog system can be queried to obtain information about a set of objects and relations represented by a Prolog program. For example, a user can query the Prolog system to determine whether or not Carly is the mother of Dan, as follows:

81 ?-mother(carly,dan).
true.

In this query, "early" is an instantiation of the variable X and "dan" is an instantiation of variable Y. In response to the "?-" prompt, a user enters the query "mother(carly,dan)." and the Prolog-based system response "true." Note that the symbols "81" indicate a query number to the user in one particular Prolog system. As another example, a user may ask the Prolog system whether Carly is the mother of Sue:

82 ?-mother(carly,sue).
false.

A user can also query the Prolog system to determine all of the children for whom Carly is the mother:

83 ?-mother(carly,X).
X=kathy;
X=dan.

In response to the query "mother(carly,X).," the Prolog system first reports a first possible instantiation of the variable X, "X=kathy." When the user types in a ";" symbol, which represents logical OR, Prolog responds with a second and final possible instantiation of the variable X, "X=dan."

Similarly, a father relation can be defined by the following father rule:

father(X,Y):-parent(X,Y),
male(X).

An example query/response involving the father rule follows:

84 ?-father(sam,X).
X=jerry;
X=betsy.

A sister relationship can be encoded as follows:

sister(X,Y):-mother(W,X),
mother(W,Y),
female(X), X \=Y.

Two user queries and Prolog-system responses with respect to the family tree shown in FIG. 1 involving the sister relationship follow:

85 ?-sister(lora,becky).
true.
86 ?-sister(lora,kirana)
false.

The symbol sequence "\=" represents "does not match" in Prolog. Thus, in the sister rule, the term "X \=Y" stands for the logical statement that whatever object is used to instantiate X does not match whatever object is used to instantiate Y. The sister rule, stated in English, represents the fact that X is a sister of Y when W is the mother of X and Y, X is a female, and X and Y are different objects. This rule does not comprehend the possibility that two individuals with a common father but different mothers may be considered to be sisters. In the current example, all children are the product of marriages between once-married individuals, so the marriage rule is adequate with respect to the family tree represented by the above-provided female, male, and parent predicates Examples of additional family-relationship rules are provided, below:
    brother(X,Y):-mother(W,X),
        mother(W,Y),
        male(X), X \=Y.
    grandmother(X,Y):-mother(X,W),
        parent(W,Y).
    grandfather(X,Y):-father(X,W),
        parent(W,Y).
    children(X,Y,L):-bagof(C, (parent(X,C), parent(Y,C)), L),
        X \=Y.
    children(X,Y):-parent(X,C),
        parent(Y,C),
        X \=Y.
    parents(X):-parent(_, X).
    married(X,Y):-parent(X,C),
        parent(Y,C),
        X \=Y.

Note that there are two different children rules, one with three arguments and one with two arguments. The arity of the head predicate along with the predicate name identifies a class of one or more related rules. The three-argument children rule identifies all of the children of parents X and Y and places the identified children into a list L, as can be seen by the following query and response:
    87 ?-children(sue,trevor,L).
    L=[debbie, steve].

In the currently described example, various rules discussed below depend on the ability to identify whether or not a first individual is a descendant of a second individual. A descendant relationship can be encoded, in Prolog, by the pair of rules:
    descendent(X,Y):-parent(Y,X).
    descendent(X,Y):-parent(Y,Z), descendent(X,Z).
The first of these rules represents the fact that X is a descendant of Y if Y is a parent of X. The second of the rules represents the fact that X is a descendant of Y if Y is the parent of Z and X is a descendant of Z. The combination of these two rules clearly defines the descendant relationship. When rules are evaluated, the Prolog system attempts to find instantiations for the variable arguments or to find other rules that replace the terms in the rule body. When the Prolog system therefore attempts to process the query "descendant(dan, sam)" the Prolog system applies the first of the above descendant rules to determine whether or not Sam is the parent of Dan. When the first rule fails, which it does in this case, then the Prolog system attempts to apply the second descendant rule, which essentially replaces the one-term query goal "descendant(X,Y)" with the two-term goal "parent(Y,Z), descendant(X,Z)." This replacement, in turn, initiates a recursive evaluation of the descendant rule. The following queries illustrate use of the descendant rule in the current example:
    88 ?-descendent(dan,sam).
    true.
    89 ?-descendent(katie,sam).
    false.

In various genetic-system rules of the genetic system, discussed below, the rule needs to determine both whether or not a first individual is a descendant of a second individual, but also, if first individual is a descendant of the second individual, the number of generations that separate the two individuals. A three-argument descendant rules which provides the number of generations separating two individuals that satisfy the descendant relationship can be written in Prolog as follows:
    descendent(X, Y, 1):-parent(Y,X).
    descendent(X,Y, S):-parent(Y,Z), descendent(X, Z, T), S is T+1.
Example queries using this rule are shown below:
    90 ?-descendent(sam, becky, S).
    false.
    91 ?-descendent(becky, sam, S).
    S=4.

A Prolog query may include multiple terms. For example, the following query can be used to determine all of the male descendants of Sam, provided as responses by the Prolog system:
    94 ?-descendent(X, sam), male(X).
    X=jerry;
    X=dan;
    X=andrew;
    X=jim;
    X=sydney;
    X=rich;
    X=dick;
    X=ben;
    X=steve;
    X=barry;
    X=ken;
    X=bill;
    X=walter;
    X=tom;
    false.

In addition to the information represented by the family tree, shown in FIG. 1, encoded by the above-provided predicates, or facts, and the information represented by the above-provided family-relationship rules, such as the mother, father, and descendant rules, the currently described genetic system uses rules to specify the distribution of inherited genetic abnormalities. A small list of example genetic-abnormality-distribution rules follows:
    indication(carly, locA, X):-X=carly.
    indication(carly, locA, X):-descendent(X, carly, S),
        female(X),
        S mod 2=:=1.
    indication(carly, locB, X):-descendent(X, carly, S),
        male(X),
        S>1.
    indication(betsy, locD, X):-descendent(X, betsy, S),
        male(X),
        S mod 2=:=1.
    indication(betsy, locD, X):-X=betsy.
    indication(betsy, locD, X):-descendent(X, betsy, S),
        female(X),
        S mod 2=:=0.
    indication(ann, locE, X):-descendent(X, ann, S),
        female(X),
        S mod 2=:=1.
    indication(sam, locF, X):-X=sam.
    indication(sam, locF, X):-descendent(X, sam, S),
        male(X), S mod 2=:=1.
indication(sam, locG, X):-descendent(X, sam, S),
male(X),
S<4.
indication(sue, locH, X):-descendent(X, betsy, S),
female(X),
S<3.

Consider the first two of the above genetic-abnormality-distribution rules. The first rule states that a genetic abnormality locA derives from. Carly and that an individual X is associated with the genetic abnormality locA when X is Carly. In other words, Carly, the first individual in the family associated with the genetic abnormality locA, exhibits the genetic abnormality locA. The second rule states that the genetic abnormality locA, within the branch of the family tree headed by Carly and Jerry, occurs in female descendants of Carly with odd generational separations. The combination of the first two rules therefore specifies the individuals in the family tree with the genetic abnormality locA. The following query/response provides a list of those individuals in the family tree of FIG. 1 having the genetic abnormality locA:

95 ?-indication(_,locA,X).
X=carly;
X=kathy;
X=elna;
X=aileen;
X=linda;
X=lora;
X=becky;
false.

Figure 3:
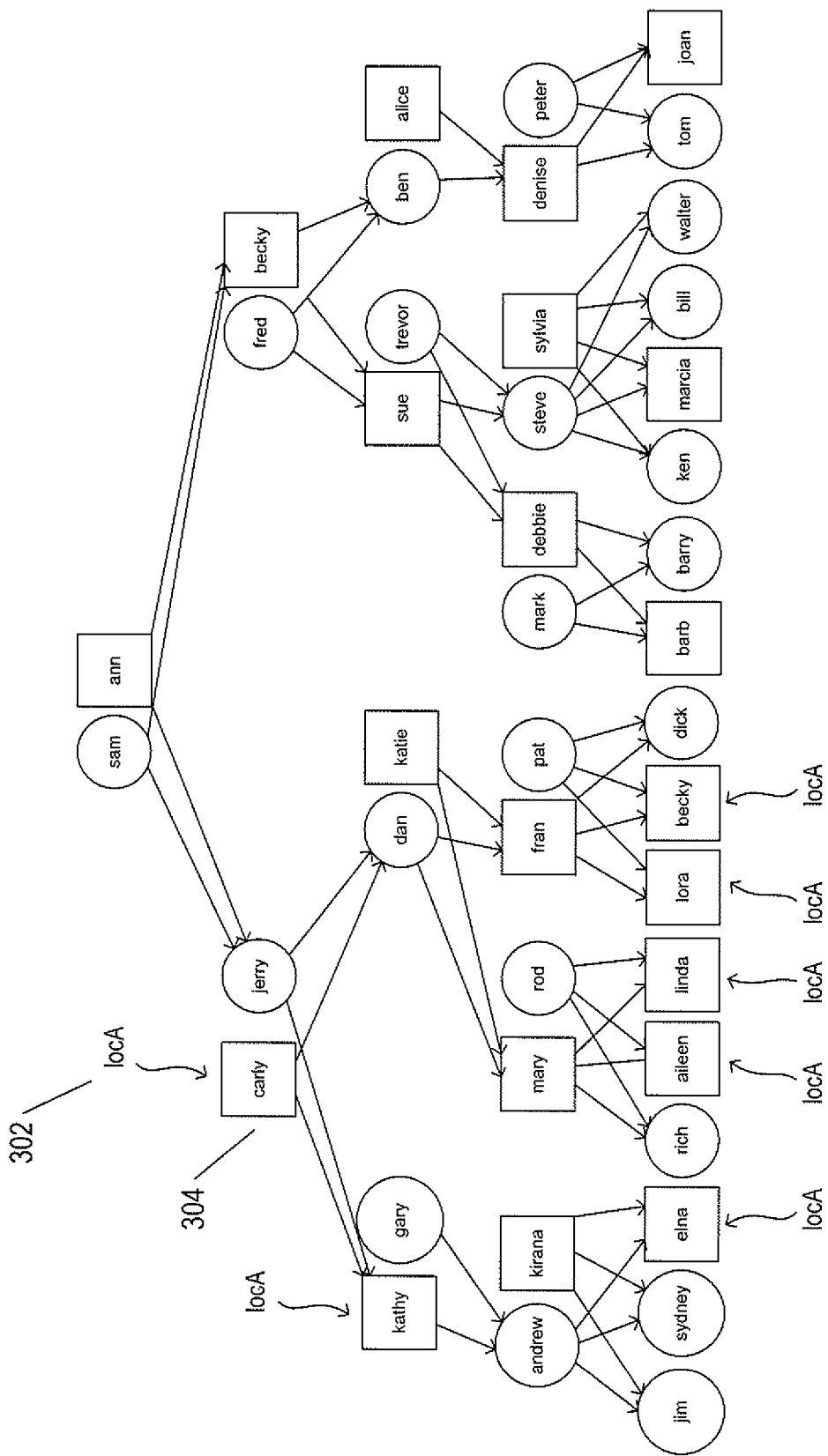
FIG. 3 illustrates the distribution of the locA abnormality within the family tree of FIG. 1.

FIG. 3 illustrates the distribution of the locA abnormality within the family tree of FIG. 1. Each individual having the locA genetic abnormality is shown in FIG. 3 with a locA indication, such as locA indication 302 for Carly 304. The distribution of the locA abnormality could be alternatively expressed by a series of facts, such as the predicate "locA (kathy)," but encoding the distribution shown in FIG. 3 as a pair of rules has many advantages. A rule encoding of the distribution is more concise, particularly for a large family tree, and automatically extends to new descendants of Sam and Ann later added to the family tree. A rule encoding may also better summarize the organizational principal of the distribution. Reading a list of predicates specifying individuals with the locA abnormality may not inform a programmer or analyst of the fact that the locA abnormality occurs only in females of odd generational separation with respect to a first individual, Carly, who exhibits or exhibited the locA genetic abnormality.

Figure 4:
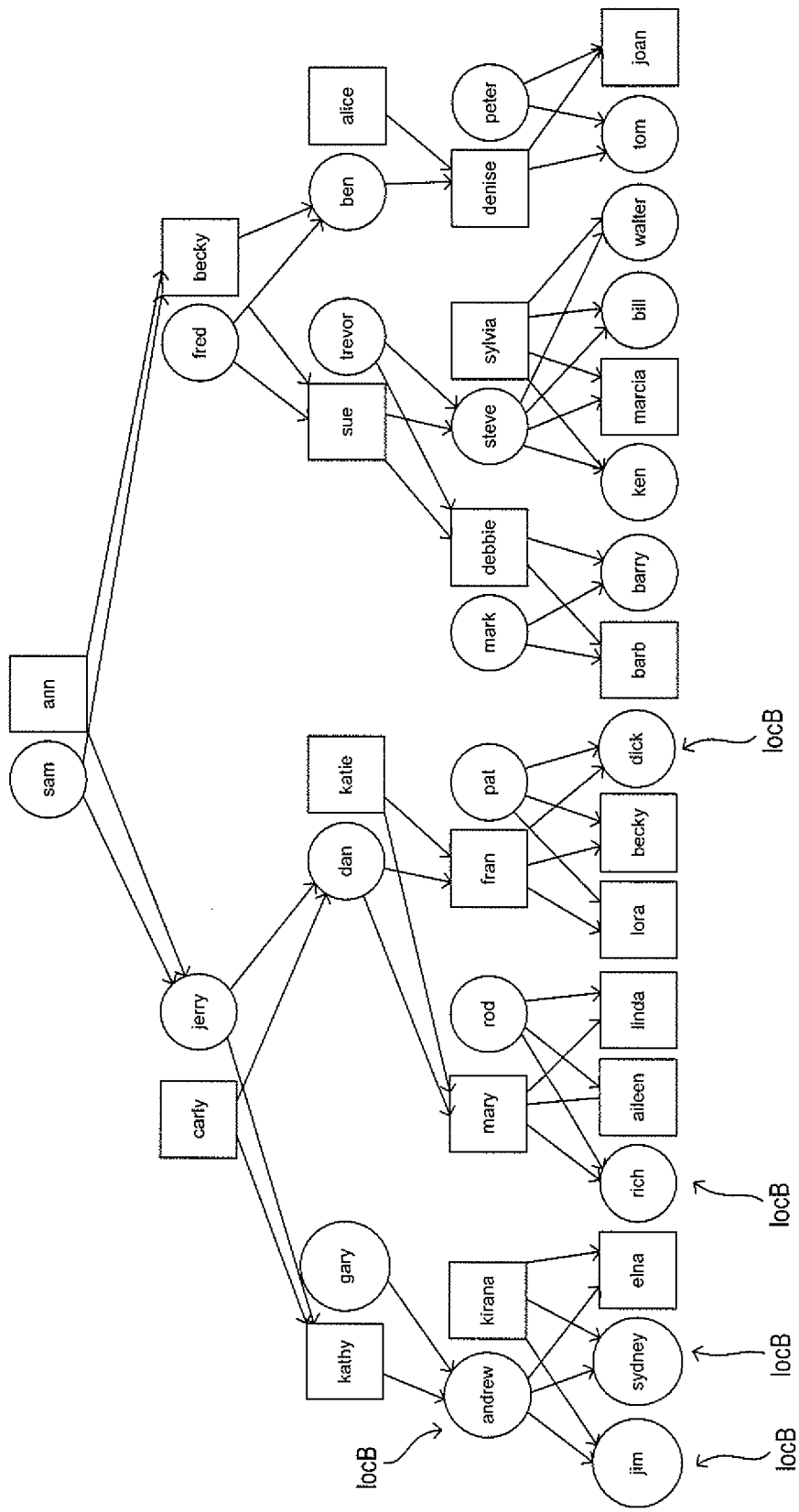
FIG. 4 illustrates the distribution of the locB abnormality within the family tree of FIG. 1.

The third genetic-abnormality rule, provided above, specifies the distribution of the locB abnormality. FIG. 4 illustrates the distribution of the locB abnormality within the family tree of FIG. 1. That distribution is alternatively provided in the following query/response:

96 ?-indication(_,locB,X).
X=andrew;
X=jim;
X=sydney;
X=rich;
X=dick;
false.

Note that the argument "_" is a variable for which reporting of instantiations is not desired. Additional query/response interactions, provided below, show the distributions for the other genetic abnormalities locD, locE, locF, locG, and locH:

97 ?-indication(_,locD,X).
X=ben;
X=barry;
X=ken;
X=bill;
X=walter;
X=tom;
X=betsy;
X=debbie;
X=denise;
false.
98 ?-indication(_,locE,X).
X=betsy;
X=mary;
X=fran;
X=debbie;
X=denise;
X=sam.
99 ?-indication(_,locF,X).
X=jerry;
X=andrew;
X=steve;
false.
100 ?-indication(_,locG,X).
X=jerry;
X=dan;
X=andrew;
X=ben;
X=steve;
false.
101 ?-indication(_,locH,X).
X=sue;
X=debbie;
X=denise;
false.

Two additional queries and responses, shown below, provide examples of additional information that a user may extract from the genetic system, including a query to determine all the genetic abnormalities carried by the individual "denise" and a query to determine the individuals having both the locH and locE abnormalities:

102 ?-indication(_,Y,denise).
Y=locD;
Y=locE;
Y=locH; false.
103 ?-indication(_,locH,X), indication(_,locE,X).
X=debbie;
X=denise;
false.

Queries, such as the last two queries shown above, may involve the genetic system searching through all of the genetic-abnormality rules, or rules named "indication," in order to process the query. In a genetic system containing genetic information for a large family tree containing thousands of individuals, each of which may be associated with one or more of thousands of different genetic abnormalities, the evaluation of queries, such as the last two queries shown above, may involve significant computational overheads as the system attempts to instantiate each of thousands of rules.

In order to facilitate query processing, the rules stored within a logic-programming system are usually indexed. FIG. 5 provides an example set of stored rules. In FIG. 5 each rule, such as the rule "a1(X,Y):-body$_1$" 502, is shown associated with a rule number, such as the rule number "1" 504 associated with the first rule 502 in the table or rules 506. The table provided in FIG. 5 lists 23 different rules. The body of the rules is represented by a subscripted word "body$_1$" rather than an actual rule body, for clarity of illustration. Of course, in an actual logic-programming system to which methods and systems of the current application are directed, there may be hundreds, thousands, or more rules. Furthermore, the rule names and variable names in this example are quite concise, while, in actual rules, these names may be longer strings of characters that convey meaning to programmers and analysts.

Were the rules stored in a flat file, the amount of time and the computational overhead associated with searching for particular rules during query resolution would be prohibitive. Therefore, the rules are generally indexed to allow particular rules and subsets of the rules to be quickly found during query resolution.

Figure 6:
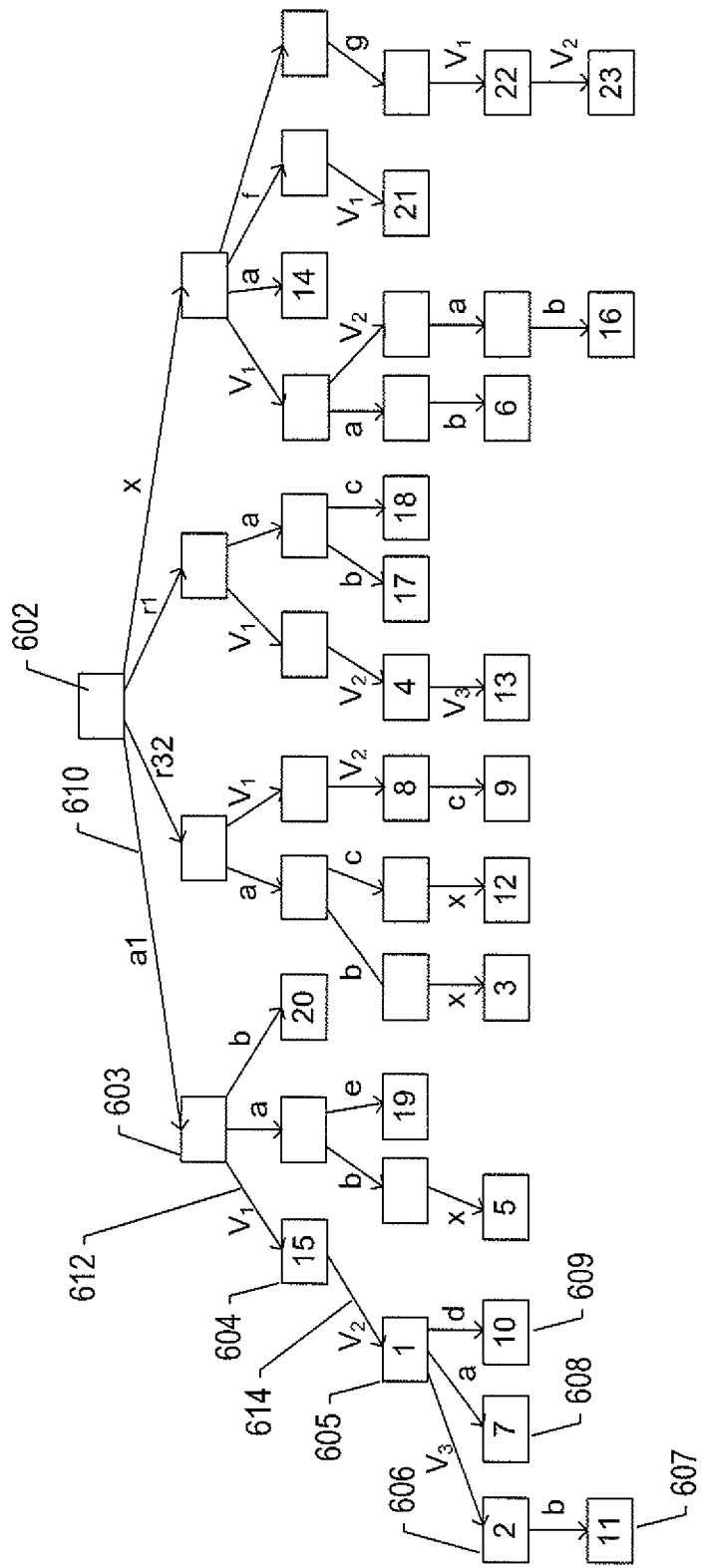
FIG. 6 illustrates a first type of rule index, referred to as a "trie."

FIG. 6 illustrates a first type of rule index, referred to as a "trie." This is a tree-like multi-dimensional index that provides relatively efficient access to any particular rule and to certain subsets of related rules. In FIG. 6, the trie data structure includes a root node 602, various intermediate-level nodes, such as nodes 603-606, and leaf nodes, such as nodes 607-609. In the illustration convention used in FIG. 6, the numbers inscribed within nodes, such as the number "11" inscribed within node 607, are the rule numbers for particular rules shown in the table provided in FIG. 5. The nodes of the trie, in practice, would generally include pointers, indexes, or some other reference to stored rules.

Each rule head is represented, in the trie, as a sequence of edge labels. For example, consider rule 502 in FIG. 5. The head-predicate name for the rule is "a1." This head-predicate name is represented by edge 610 in the trie shown in FIG. 6. The first argument of the rule is "X," which is a variable argument. This first variable argument is represented by edge 610 in the trie shown in FIG. 6, labeled "$V_1$." Because variable-argument names are simply placeholders, variable-argument names are represented in the trie as generic variable-argument indications rather than using the actual names of the variable arguments that appear in the rule, such as "X." The second variable-argument name in rule 502 in FIG. 5 is "Y," which is represented by edge 614 in the trie shown in FIG. 6. The lower-level node, node 605, connected by this edge to the higher-level nodes in the path comprising nodes 602-605 and edges 610, 612, and 614 therefore represents rule 1 and is labeled with the number "1." The trie shown in FIG. 6 represents, in similar fashion, all of the remaining rules in the table of rules shown in FIG. 5. The organization of the trie collects certain lexically related rules, such as all rules with the head-predicate name "a1," into subtrees of the trie.

Figure 7:
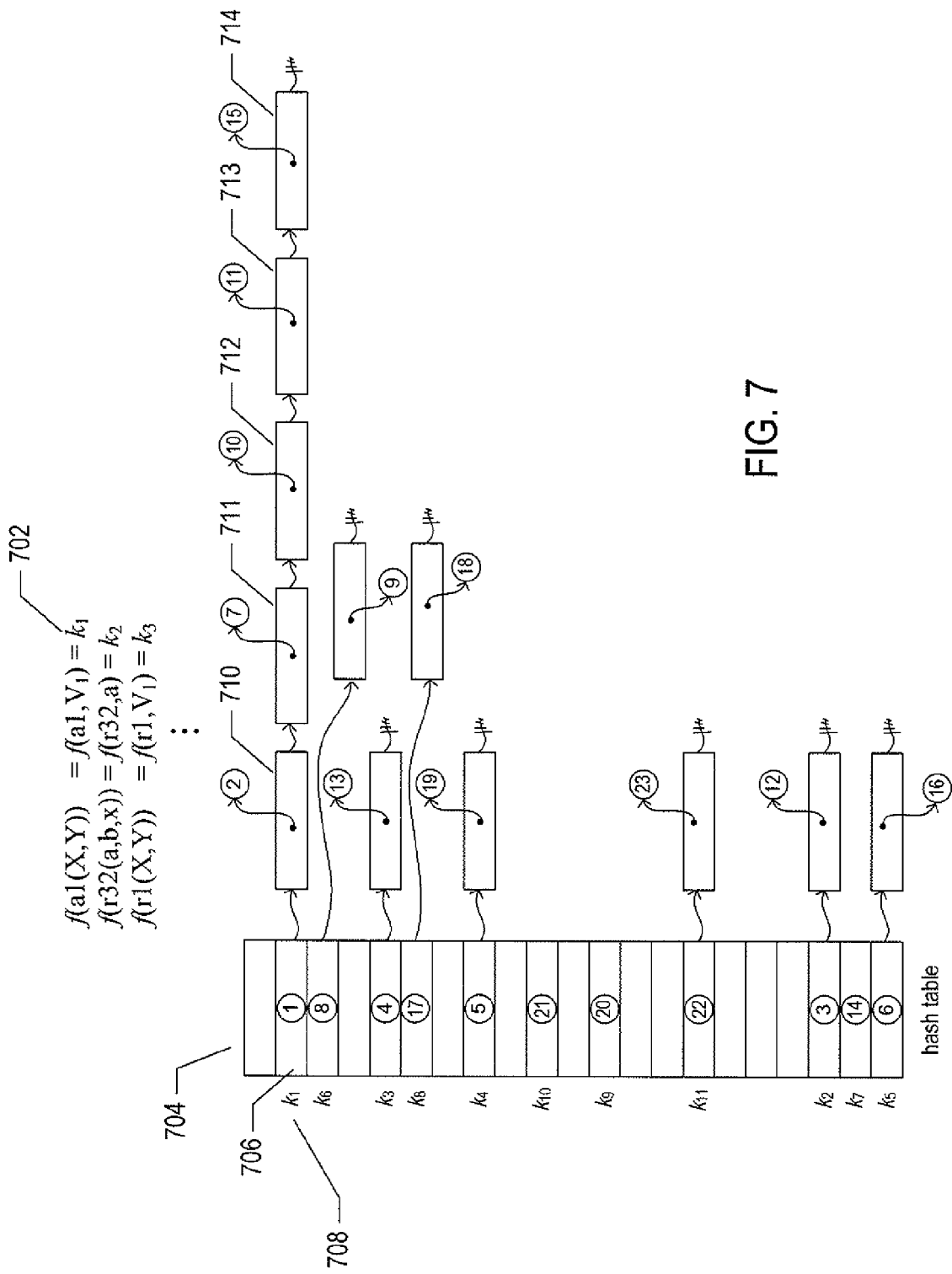
FIG. 7 shows an alternative indexing method for the set of stored facts shown in FIG. 6.

FIG. 7 shows an alternative indexing method for the set of rules shown in the table of rules provided in FIG. 5. This is a hash-based indexing method. As shown at the top of FIG. 7 by equations 702, a hash function $f( )$ is applied to a rule to produce a hash value, represented in FIG. 7 by lower-case subscripted "k" symbols. These are generally integers that are used as indexes into a hash table 704. The hash table is a range of memory addresses indexed by the keys generated by the hash function. As indicated at the top of FIG. 7 by equations 702, for the example shown in FIG. 7, the hash function considers only the head-predicate name and the first argument of the head predicate when generating a corresponding hash value.

References to those rules for which the hash function returns a common hash value are stored either in an entry of the hash table indexed by the common hash value or in one of one or more buckets associated with the hash-table entry. For example, as can be seen in the set of rules provided in FIG. 5, rules 1, 2, 7, 10, 11, and 15 all have the head-predicate name "a1" and all have a first variable argument. Thus, the hash function applied to all of these rules returns a common hash value $k_1$, as indicated by the first equation in the set of equations 702 at the top of FIG. 7. The first rule is referenced from entry 706 in the hash table indexed by hash value $k_1$ 708 and the remaining rules in this subset of rules with head-predicate name "a1" and with a first variable argument are referenced from a series of buckets 710-714 referenced from the entry 706 of the hash table indexed by hash value $k_1$ 708. In alternative implementations, the hash function may consider the head-predicate name and additional arguments. A variety of different implementation details may be varied to produce a variety of different alternative implementations.

For certain types of retrieval operations, the hash-based index shown in FIG. 7 may be more efficient than the trie shown in FIG. 6, and, for other types of retrieval operations, the trie may be more efficient than the hash-based index. Many other types of indexes are possible. These are but two simple examples of a large number of possible indexing methods.

Many different indexing methods may be incorporated within retrieval subsystems of a logic-programming system for retrieving facts, and rules. The appropriate index for a particular class of facts or rules may depend on the average and maximum lengths of fact and rule names, the number of facts and rules, the number and type of ID rules in which the rules and facts are embedded, the access patterns for the rules and facts within the system, and other such characteristics and parameters. Logic-programming systems may employ multiple different types of indexes to facilitate retrieval of any particular class of rules or facts, choosing one or more indexes at run time based on various heuristics and parameters. A logic-programming system may dynamically configure new indexing methods incorporated within the system's indexing subsystem as the size and complexity of stored information increases, over time. Currently, significant ongoing research and development efforts are directed to devising, implementing, and configuring new types of indexes for logic-programming systems and for creating new retrieval subsystems or enhancing existing retrieval subsystems to take advantage of newly devised indexing methods.

In many cases, logic-programming systems may use a first set of indexes for indexing rules and a second set of indexes for indexing facts. Furthermore, in many logic-programming systems, one set of indexes may be employed for static, program-defined predicates while a second set of indexes is used for dynamic predicates asserted at run time, and similarly for rules. In many cases, as one example, the indexing and retrieval facilities for facts employ a larger selection of indexes and index-based retrieval methods than the retrieval subsystem for rules. As a consequence, such systems may, in many cases, retrieve facts, more efficiently than rules. However, as discussed above using the genetic-system example, it is often desirable to encode information using rules, rather than facts. As a result, significant research and development efforts are currently devoted to implementing larger and more diverse sets of indexes, and retrieval methods based on the indexes, for rules, in order to increase the computational efficiency of logic-programming systems. However, these efforts are associated with certain disadvantages. First, there is a significant latency associated with new research and development efforts. Second, there may be significant, and even prohibitive, implementation overheads associated with adding new types of indexes and index-based retrieval methods into an existing system.

Replacement of Rules in the Example
Logic-Programming System According to an
Implementation of the Methods to which the Current
Application is Directed The current application is directed to expanding the availability of different types of indexes and index-based retrieval methods within a logic-programming system for sets of original rules by converting the original rules into a set of equivalent fact/rule pairs, with the fact portions of the fact/rule pairs indexed using the indexing methods and retrieved using the index-based retrieval methods available for facts. In other words, by converting an original set of rules to an equivalent set of fact/rule pairs, the built-in indexes and index-based retrieval methods for facts become available for rules. Converted rules are specified, in the logic program, exactly as the original rules from which they are converted. Thus, the syntax of the logic language is not changed and the remaining portions of the logic programming system do not need to be rewritten in order to take advantage of the new indexing/retrieval methods.

The methods to which the current application is directed are next illustrated, using the genetic-information-system example developed above and illustrated in FIGS. 1-4. In this example, the genetic-abnormality rules, or indication rules, are converted to fact/rule pairs so that the facts of the fact/rule pairs are automatically indexed using the built-in indexes and retrieval methods for facts. Note that the genetic-abnormality rules all have the common predicate name "indication" in the rule head and all have three arguments. The rule-replacement method replaces the original rules having heads with this common name and having an arity of three. In the following discussion, rules replaced by the rule-replacement method that represents one implementation of the methods to which the current application is directed are referred to as "original rules."

First, a new gateway rule is created for the set of three-argument indication rules:

indication(X1, X2, X3):-index_for_indication_3(X1, X2, X3, Call), call(Call).

The gateway rule features a general predicate in the rule head for the rule heads of the rules being replaced. The gateway predicate thus includes a variable for each argument. The above gateway rule has the head "indication(X1, X2, X3)" which has the general three-argument indication predicate.

The body of the gateway rule includes two terms. The first term "index_for_indication_3(X1, X2, X3, Call)," is a new predicate with four arguments, the first three of which are identical to the arguments of the predicate in the head of the gateway rule and a fourth argument, "Call," discussed below. The second term of the gateway-rule body uses the Prolog built-in predicate "call" to evaluate the fourth argument in the predicate that is the first term of the gateway rule. The gateway rule essentially states that, during evaluation of a term comprising a predicate named indication with three arguments, the term is replaced by the two terms in the body of the gateway rule, the last of which results in evaluation of the fourth argument of the predicate in the first term.

Next, for each of the original indication rules, an IDX fact is created:

index_for_indication_3(carly, locA, X, id_for_indication_3_1(X)).
index_for_indication_3(carly, locA, X, id_for_indication_3_2(X)).
index_for_indication_3(carly, locB, X, id_for_indication_3_3(X)).
index_for_indication_3(betsy, locD, X, id_for_indication_3_4(X)).
index_for_indication_3(betsy, locD, X, id_for_indication_3_5(X)).
index_for_indication_3(betsy, locD, X, id_for_indication_3_6(X)).
index_for_indication_3(ann, locE, X, id_for_indication_3_7(X)).
index_for_indication_3(sam, locE, X, id_for_indication_3_8(X)).
index_for_indication_3(sam, locF, X, id_for_indication_3_9(X)).
index_for_indication_3(sam, locG, X, id_for_indication_3_10(X)).
index_for_indication_3(sue, locH, X, id_for_indication_3_11(X)).

Each IDX fact is an instantiation of the first term of the gateway rule. Each of the IDX facts is therefore a predicate with a predicate name equal to the predicate name of the first term of the gateway rule, "index_for_indication_3." The first three arguments of the fact are identical to the three arguments of the original rule. The fourth argument of the IDX fact is a predicate, the name of which is a unique identifier for the original rule and the arguments of which are any variables, in sequence, that occur in the same sequence as the variables of the original rule. In the current case, the first original rule has arguments "early," "locA," and "X." The first IDX fact is a predicate with those same arguments. The final argument of the first IDX fact "id_for_indication_3_1(X)" is a predicate with a name that is a unique identifier of the first original rule and with one argument corresponding to the one variable X in the arguments of the original rule. This same pattern is followed for the remaining IDX facts, as can be verified by comparing each of the IDX facts with the corresponding original indication rule.

Finally, an additional set of ID rules is created in correspondence with the original rules:

id_for_indication_3_1(X):-X=carly.
id_for_indication_3_2(X):-descendent(X, carly, S),
female(X),
S mod 2=:=1.
id_for_indication_3_3(X):-descendent(X, early, S),
male(X),
S>1.
id_for_indication_34(X):-descendent(X, betsy, S),
male(X),
S mod 2=:=1.
id_for_indication_3_5(X):-X=betsy.
id_for_indication_3_6(X):-descendent(X, betsy, S),
female(X),
S mod 2=:=0.
id_for_indication_3_7(X):-descendent(X, ann, S),
female(X),
S mod 2=:=1.
id_for_indication_3_8(X):-X=sam.
id_for_indication_3_9(X):-descendent(X, sam, S),
male(X),
S mod 2=:=1.
id_for_indication_3_10(X):-descendent(X, sam, S),
male(X),
S<4.
id_for_indication_3_11(X):-descendent(X, betsy, S),
female(X),
S<3.

The body of each of these ID rules is identical to the body of a corresponding original rule. For example, the body of the first original indication rule is "X=carly," and the body of the first ID rule is the same. The head of each ID rule is a predicate that is identical to the fourth argument of the corresponding new fact. For example, the head of the first ID rule "id_for_indication_3_1(X)" is identical to the fourth argument of the first new fact "index_for_indication_3(carly, locA, X, id_for_indication_3_1(X))."

The gateway rule, set of IDX facts, and set of ID rules, is equivalent to the original rules, which can now be deleted.

Alternatively, when a new set of rules having the same arity and name are added to a logic-programming system, referred to below as "new rules," fact/rule pairs equivalent to the new rules may instead be added, straightaway, without first adding the new rules. During resolution of logic-program clauses, when an original rule or new rule occurs within a Prolog clause, the original rule or new rule is first replaced by the gateway-rule body, with the gateway-rule arguments instantiated using the original-rule or new-rule arguments. The gateway-rule body is then resolved by replacing the gateway-rule body with instantiations of the two terms in the body of the gateway rule. Instantiation of the first term replaces the first term with the IDX fact corresponding to the original rule or new rule, and evaluation of this fact, in turn, results in the instantiation of the fourth argument to the appropriate IDX fact. The instantiated fourth argument is evaluated as a result of the Prolog "call" predicate, which effectively replaces the instantiated fourth argument with the body of the matching ID rule.

In summary, the original genetic-information-system program included the following original indication rules:
  indication(carly, locA, X):-X=early.
  indication(carly, locA, X):-descendent(X, early, S),
  female(X),
  S mod 2=:=1.
  indication(carly, locB, X):-descendent(X, early, S),
  male(X),
  S>1.
  indication(betsy, locD, X):-descendent(X, betsy, 5),
  male(X),
  S mod 2=:=1.
  indication(betsy, locD, X):-X=betsy.
  indication(betsy, locD, X):-descendent(X, betsy, S),
  female(X),
  S mod 2=:=0.
  indication(ann, locE, X):-descendent(X, ann, S),
  female(X),
  S mod 2=:=1.
  indication(sam, locF, X):-X=sam.
  indication(sam, locF, X):-descendent(X, sam, S),
  male(X),
  S mod 2=:=1.
  indication(sam, locG, X):-descendent(X, sam, S),
  male(X),
  S<4.
  indication(sue, locH, X):-descendent(X, betsy, 5),
  female(X),
  S<3.
These original rules are replaced by the following gateway rule, IDX facts, and ID rules:
  indication(X1, X2, X3):-index_for_indication_3(X1, X2, X3, Call), call(Call).
  index_for_indication_3(carly, locA, X, id for_indication_3_1(X)).
  index_for_indication_3(carly, locA, X, id for_indication_3_2(X)).
  index_for_indication_3(carly, locB, X, id_for_indication_3_3(X)).
  index_for_indication_3(betsy, locD, X, id_for_indication_3_4(X)).
  index_for_indication_3(betsy, locD, X, id_for_indication_3_5(X)).
  index_for_indication_3(betsy, locD, X, id_for_indication_3_6(X)).
  index_for_indication_3(ann, locE, X, id_for_indication_3_7(X)).
  index_for_indication_3(sam, locE, X, id for_indication_3_8(X)).
  index_for_indication_3(sam, locF, X, id_for_indication_3_9(X)).
  index_for_indication_3(sam, locG, X, id_for_indication_3_10(X)).
  index_for_indication_3(sue, locH, X, id_for_indication_3_11(X)).
  id_for_indication_3_1(X):-X=early.
  id_for_indication_3_2(X):-descendent(X, early, S),
  female(X),
  S mod 2=:=1.
  id_for_indication_3_3(X):-descendent(X, early, 5),
  male(X),
  S>1.
  id_for_indication_3_4(X):-descendent(X, betsy, S),
  male(X),
  S mod 2=:=1.
  id_for_indication_3_5(X):-X=betsy.
  id_for_indication_3_6(X):-descendent(X, betsy, S),
  female(X),
  S mod 2=:=0.
  id_for_indication_3_7(X):-descendent(X, ann, S),
  female(X),
  S mod 2=:=1.
  id_for_indication_3_8(X):-X=sam.
  id_for_indication_3_9(X):-descendent(X, sam, S),
  male(X),
  S mod 2=:=1.
  id_for_indication_3_10(X):-descendent(X, sam, S),
  male(X),
  S<4.
  id_for_indication_3_11(X):-descendent(X, betsy, S),
  female(X),
  S<3.

The gateway rule, ID rules, and IDX facts produce the same effect as the original rules. Now, however, each original rule has been replaced by a corresponding IDX fact and ID rule. The IDX facts include all of the arguments of the original rule head predicate, and can be indexed using indexing methods and index-based retrieval methods for facts. In many cases, the built-in indexing methods and index-based retrieval methods for facts may index facts based on the name of predicates as well as multiple arguments of the predicates, and provide finer-resolution indexing and corresponding faster and more efficient retrieval than the built-in indexing methods and index-based retrieval methods for rules. The latter indexing methods are typically of a much more limited variety, such as indexing methods based only on the predicate name and only one of the arguments. Of course, the ID rules generated by the above-described rule-replacement method are indexed by the built-in indexes for rules and are retrieved by the index-based retrieval methods for rules. However, each ID rule has a unique predicate name. Therefore, a simple built-in index based on the full predicate name can efficiently locate each of the new rules.

The above-described rule replacement therefore may provide faster and more efficient retrieval of rules in those logic-programming systems in which facts are provided with a wider range of indexing methods than rules. In particular, in systems where the indexing methods for facts may consider both a predicate name as well as the names of multiple arguments, and in which indexing methods for rules consider only the predicate name of the predicate and, possibly, one of the arguments in the head of the rule, replacement of a set of original rules by a set of equivalent fact/rule pairs according to the currently disclosed method may provide faster and more efficient rule retrieval.

A Formal Description of the Methods to which the Current Application is Directed Next, a formal description of one implementation of the rule-replacement method to which the current application is directed is provided. The original or new rules are described as:
original or new rules:

$$p(T_1^1, \ldots, T_n^1)\text{:-body}_1$$
$$p(T_1^2, \ldots, T_n^2)\text{:-body}_2$$
$$\vdots$$
$$p(T_1^r, \ldots, T_n^r)\text{:-body}_r$$

where p is name of the original or new rules;
n is the arity of the original or new rules;
$T_y^x$ is the $y^{th}$ term for the $x^{th}$ original or new rule;
r is a number of original rules;
$body_x$ is the body of rule x.

The rule-replacement method is quite general. For example, the terms $T_y^x$ in the predicate comprising the head of the rule can be fully instantiated object names, variables, or the names of hierarchical data structures. There can be an arbitrary number r of original rules having arbitrary rule bodies and a common arbitrary name p.

The gateway rule created for the original or new rules can be formally described as:
gateway rule:
$p(X_1, \ldots, X_n)$:-index_for_p_n$(X_1, \ldots, X_n,\text{Call})$, call (Call)
where $X_x$ is an $X^{th}$ variable;
Call is a variable; and
call is a built-in predicate that causes evaluation of argument Call.

The predicate name "index_for_p_n" is, in the above-provided example, "index_for_indication_3." Thus, the p and n stand for the name and arity of the set of rules being replaced. The form of the predicate name can vary. The only constraints are that the predicate name uniquely identifies the set of original or new rules and that the same predicate name is used for the new facts.

The new facts for the fact/rule replacements are formally described as:
new facts:

$$\text{index\_for\_p\_n}(T_1^1, \ldots, T_n^1, \text{id\_p\_n\_1}(Vars_1))$$
$$\vdots$$
$$\text{index\_for\_p\_n}(T_1^r, \ldots, T_n^r, \text{id\_p\_n\_r}(Vars_r))$$

where $Vars_x$ is a list of variables that occur in head of original rule x; and
id_p_n_x is an identifier for original rule x.
In the above-provided example, the predicate name "id_p_n_1" is "id_indication_3_1." The variable "$Var_1$" is X in the above-described example of rule replacement. The form of this predicate name is simply an example. The only constraints on this predicate name are that it is uniquely associated with a corresponding original or new rule and that it is used for the corresponding new rule.

Finally, the new rules for the fact/rule rule replacements can be described as:
new rules:

$$\text{id\_p\_n\_1}(Vars_1)\text{:-body}_1$$
$$\vdots$$
$$\text{id\_p\_n\_r}(Vars_r)\text{:-body}_r$$

Figure 8:
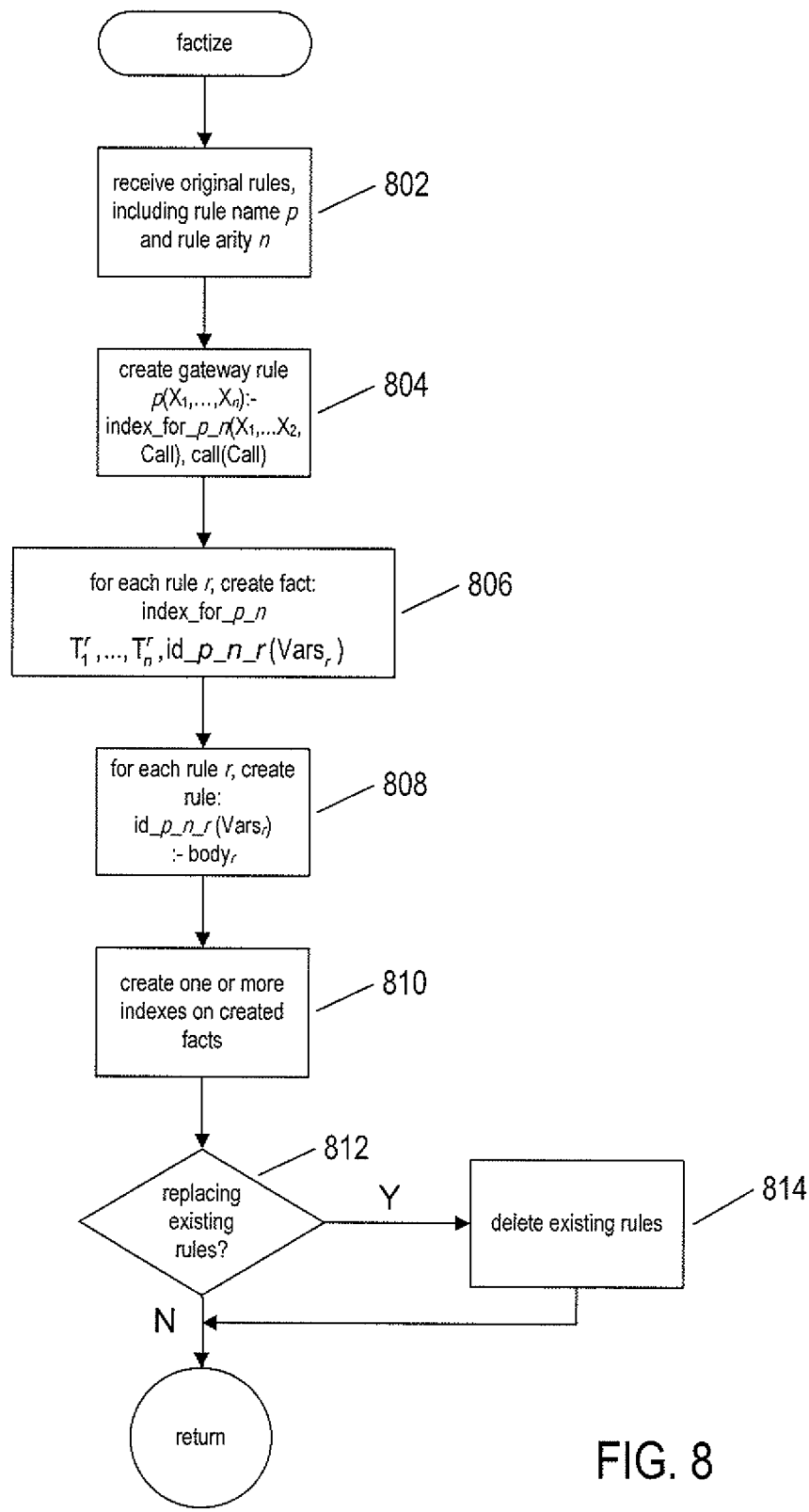
FIG. 8 provides a control-flow diagram for a routine "factize" that represents one implementation of the method to which the current application is directed.

FIG. 8 provides a control-flow diagram for a routine "factize" that represents one implementation of the method to which the current application is directed. In step 802, the routine "factize" receives the original rules that are to be replaced including the original-rule name p and the original-rule arity n. Next, in step 804, a gateway rule for the original set of rules is created. In step 806, new facts corresponding to the original rules are created and in step 808, new rules corresponding to the original rules are created. In step 810, one or more indexes are created for the new facts. This may be automatically carried out by the logic-programming system or may be carried out by the logic-programming system in response to user directives. In the case that the original rules are currently resident within the system, as determined in step 812, the original rules are then deleted in step 814.

The method may be automated and incorporated into a logic-programming system, with the logic-programming-system compiler or interpreter automatically detecting sets of rules having a particular head-predicate name and head-predicate arity and replacing the detected set of rules with fact/rule pairs, according to the currently disclosed method, when the logic-programming system determines that fact-associated indexing methods within the system would provide greater computational efficiency than rule-associated indexing methods. The method may be carried out semi-automatically, with inputs, including authorization-related inputs, requested from users.

Figure 9:
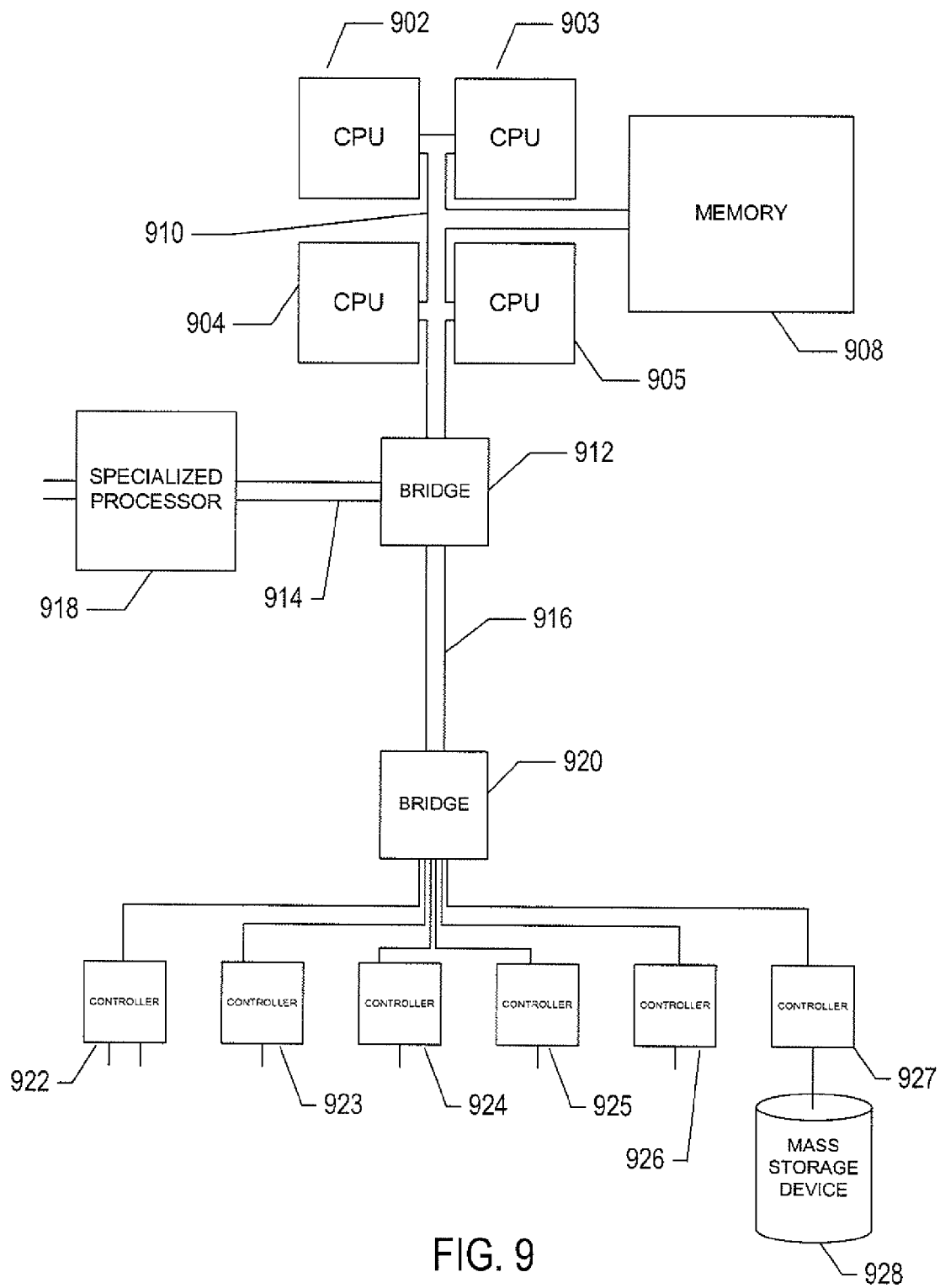
FIG. 9 provides a general architectural diagram for various types of computers.

FIG. 9 provides a general architectural diagram for various types of computers. Such computers may comprise the hardware layer, or a portion of the hardware layer, of logic-programming systems. The computer system contains one or multiple central processing units ("CPUs") 902-905, one or more electronic memories 908 interconnected with the CPUs by a CPU/memory-subsystem bus 910 or multiple busses, a first bridge 912 that interconnects the CPU/memory-subsystem bus 910 with additional busses 914 and 916, or other types of high-speed interconnection media, including multiple, high-speed serial interconnects. These busses or serial interconnections, in turn, connect the CPUs and memory with specialized processors, such as a graphics processor 918, and with one or more additional bridges 920, which are interconnected with high-speed serial links or with multiple controllers 922-927, such as controller 927, that provide access to various different types of mass-storage devices 928, electronic displays, input devices, and other such components, subcomponents, and computational resources. In the following, the terms "memory" and "memories" may refer to electronic memories, such as random-access memories, mass storage devices, and other such physical devices and subsystems that can store data for subsequent retrieval by a computer system.

Although the present invention has been described in terms of particular embodiments, it is not intended that the invention be limited to these embodiments. Modifications within the spirit of the invention will be apparent to those skilled in the art. For example, the rule-replacement method, disclosed above, and rule-retrieval subsystems that incorporate the rule-replacement method, when automated, may be implemented in any of many different programming languages in various ways by varying any of many different development and implementation parameters, including underlying operating system, control structures, data structures, and other such parameters. The predicate-renaming conventions used for the gateway rule, new set of facts, and new set of rules may be varied, as discussed above, provided the above-discussed constraints are met. Although a Prolog example is used as context for discussing the methods and systems to which the current applications is directed, the methods can be applied using any of many different logic-programming languages.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A logic-programming-based computer system comprising:
   one or more processors;
   one or more memories from which instructions and data, including facts, rules, and indexes, are retrieved by the one or more processors and in which instructions and data are stored by the by the one or more processors;
   a first set of indexes that index facts stored in the one or more memories;
   a second set of indexes that index rules stored in the one or more memories;
   a logic program stored in one of the one or more memories;
   a gateway rule within the logic program; and
   a set of fact-rule pairs, within the logic program, each fact-rule pair of which is indexed by one or more indexes of the first set of indexes and, in combination with the gateway rule, implements a rule within the logic program.

2. The logic-programming-based computer system of claim 1 wherein the gateway rule includes a head predicate having:
   a gateway-rule with a head predicate name identical to the head predicate name of each of the rules implemented by the set of fact-rule pairs and the gateway rule; and
   a body with at least two terms.

3. The logic-programming-based computer system of claim 2 wherein the head predicate of the gateway rule further comprises n variable arguments, where n is the arity of the rules implemented by the fact-rule pairs in the set of fact-rule pairs.

4. The logic-programming-based computer system of claim 3 wherein the body of the gateway rule further comprises:
   a first predicate, having a first-predicate name, different from the name of the gateway rule head predicate name, that uniquely identifies a set of rules implemented by the gateway rule and the set of fact-rule pairs; and
   a second predicate that represents a built-in evaluation operation.

5. The logic-programming-based computer system of claim 4 wherein the first predicate of the body includes n+1 variable arguments, the first 77 variable arguments corresponding to n arguments of the head predicate of the gateway rule and the final variable having a final-variable name.

6. The logic-programming-based computer system of claim 5 wherein each fact-rule pair of the set of fact-rule pairs comprises:
   a IDX fact; and
   a ID rule.

7. The logic-programming-based computer system of claim 6 wherein each IDX fact includes:
   a predicate name identical to the first-predicate name;
   n arguments corresponding to n arguments of a rule implemented by the gateway rule and the set of fact-rule pairs; and
   a final argument comprising a predicate having a name that uniquely identifies the rule implemented by the gateway rule and the set of fact-rule pairs and a number of variable arguments equal to the number of variable arguments of the rule implemented by the gateway rule and the set of fact-rule pairs.

8. The logic-programming-based computer system of claim 6 wherein each ID rule includes:
   a head predicate with a name identical to the predicate name of a final argument of a corresponding IDX fact and with a number of variable arguments equal to the number of variable arguments of a rule implemented by the gateway rule and the set of fact-rule pairs; and
   a body corresponding to the body of the rule implemented by the gateway rule and the set of fact-rule pairs.

9. The logic-programming-based computer system of claim 1 wherein the logic program implements a top-level logic of the logic-programming-based computer system.

10. A method comprising:
    providing logic-programming-based computer system having
       one or more processors,
       one or more memories from which instructions and data, including facts, rules, and indexes, are retrieved by the one or more processors and in which instructions and data are stored by the by the one or more processors,
       a first set of indexes that index facts stored in the one or more memories,
       a second set of indexes that index rules stored in the one or more memories, and
       a logic program stored in one of the one or more memories;
    implementing a gateway rule within the logic program; and
    implementing a set of fact-rule pairs, within the logic program, each fact-rule pair of which is indexed by one or more indexes of the first set of indexes and, in combination with the gateway rule, implements a rule within the logic program.

11. The method of claim 10 wherein implementing the gateway rule further comprises:
    implementing a head predicate having
       a gateway-rule with a head predicate name identical to the head predicate name of each of the rules implemented by the set of fact-rule pairs and the gateway rule, and
       a body with at least two terms.

12. The method of claim 11 wherein the head predicate of the gateway rule further comprises n variable arguments, where n is the arity of the rules implemented by the fact-rule pairs in the set of fact-rule pairs.

13. The method of claim 12 wherein the body of the gateway rule further comprises:

a first predicate, having a first-predicate name, different from the name of the gateway rule head predicate name, that uniquely identifies a set of rules implemented by the gateway rule and the set of fact-rule pairs; and a second predicate that represents a built-in evaluation operation.

14. The method of claim 13 wherein the first predicate of the body includes n 1 variable arguments, the first n variable arguments corresponding to n arguments of the head predicate of the gateway rule and the final variable having a final-variable name.

15. The logic-programming-based computer system of claim 14 wherein implementing each fact-rule pair of the set of fact-rule pairs comprises:

implementing a IDX fact; and implementing a ID rule.

16. The method of claim 15 wherein each IDX fact includes:

a predicate name identical to the first-predicate name;

n arguments corresponding to n arguments of a rule implemented by the gateway rule and the set of fact-rule pairs; and a final argument comprising a predicate having a name that uniquely identifies the rule implemented by the gateway rule and the set of fact-rule pairs and a number of variable arguments equal to the number of variable arguments of the rule implemented by the gateway rule and the set of fact-rule pairs.

17. The implementing of claim 15 wherein each ID rule includes:

a head predicate with a name identical to the predicate name of a final argument of a corresponding IDX fact and with a number of variable arguments equal to the number of variable arguments of a rule implemented by the gateway rule and the set of fact-rule pairs; and a body corresponding to the body of the rule implemented by the gateway rule and the set of fact-rule pairs.

18. The implementing of claim 10 wherein the logic program implements a top-level logic of the logic-programming-based computer system.

19. The method of claim 10 used to replace n original rules in the logic program with the gateway rule and a set of n fact-rule pairs.

20. The method of claim 10 used to create n new rules in the logic program by creating the gateway rule and a set of n fact-rule pairs.

* * * * *